F. P. KIRK.
LOCK NUT.
APPLICATION FILED NOV. 12, 1919.

1,378,681. Patented May 17, 1921.

F. P. Kirk, Inventor

UNITED STATES PATENT OFFICE.

FRANK P. KIRK, OF ST. ALBANS, VERMONT.

LOCK-NUT.

1,378,681.   Specification of Letters Patent.   Patented May 17, 1921.

Application filed November 12, 1919. Serial No. 337,429.

*To all whom it may concern:*

Be it known that I, FRANK P. KIRK, a citizen of the United States of America, residing at St. Albans, in the county of Franklin and State of Vermont, have invented new and useful Improvements in Lock-Nuts, of which the following is a specification.

The object of the invention is to provide a simple and effective lock nut adapted for use in connection with bolts subject to vibration and therefore liable to loosening movement relative to the bolt with which the same is engaged and to this end the invention consists in a construction and combination of parts of which a preferred embodiment is shown in the accompanying drawing, wherein.

Figure 1:
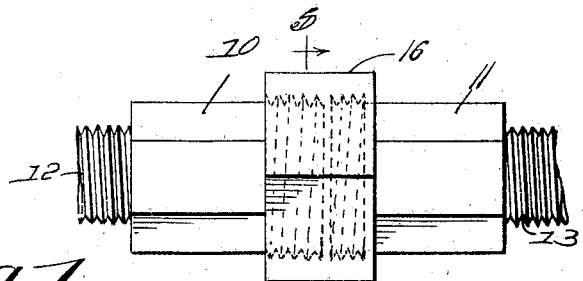
Figure 1 is a side view.
Figure 2:
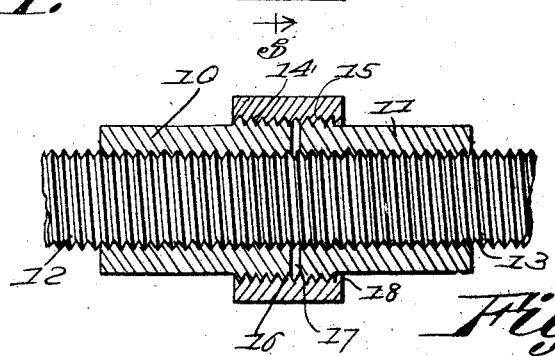
Fig. 2 is a longitudinal section.
Figure 3:
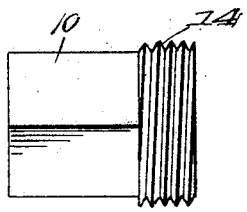
Figs. 3 and 4 are detached views of the main nut members.
Figure 4:
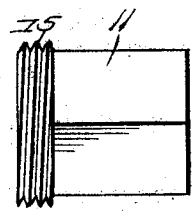
Figure 5:
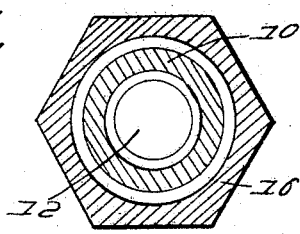
Fig. 5 is a transverse section on the plane indicated by the line 5—5 of Fig. 1.

The main or holding nut consists of the independent relatively movable members 10 and 11 threaded in the usual way upon a bolt 12 and provided in addition to the interior threads 13 with exterior threaded portions 14 and 15 arranged near the inner or adjacent ends of said members for engagement by a locking ring 16. In applying the nut to a bolt it is preferable to adjust the members of the main nut so as to leave a slight interval between their adjacent extremities as indicated at 17, and to then adjust the locking ring to engage both of the main members, the thread by which engagement is made between the locking ring and the members of the nut being reversed with relation to the threads by which engagement is made between the nut members and the bolt. For example, when the engagement of the nut with the bolt is by a right-hand thread as indicated, the engagement of the locking ring with the nut members is by a left-hand thread, and preferably the locking ring is provided with an inwardly extending stop shoulder or flange 18 for limiting the movement of said ring relative to the nut member 11, so as to insure a proper engagement of the ring with the exteriorly threaded portions of both main nut members.

It is obvious moreover that said nut members and locking ring may be provided with any suitable forms of wrench seats or may have any desired exterior contour for engagement by tools to adjust said parts relative to the bolt and each other.

Since the members 10 and 11 are reversely threaded as regards the holding nut 16, when the two are mounted on a bolt such as the bolt 12 and their exterior portions 14 and 15 engaged with the locking ring, any movement of either of the members 10 or 11 will tend to advance them one way or the other along the screw 12 but the direction in which the members would be moved because of the angle of the threads on the screw would be opposed because of the tendency of the angle of the threads in the ring 16 tending to move the member in the opposite direction. Prior to engaging the lock ring 16 with the enlarged threaded portions 14 and 15 of the two members, the two latter are set to the position desired and the locking ring then engaged with the two, being rotated until the inwardly extending stop 13 abuts the shoulder formed by the enlarged portion 15 with the remaining portion of the element 11. The device may then be subjected to all sorts of vibration without fear of the device becoming loose.

What is claimed is:

A nut lock consisting of two internally threaded sleeves enlarged at one extremity and provided with threads thereon the reverse of the internal threads, and a locking ring threaded to engage said internal threads and provided with an inturned flange or stop at one end for abutting engagement with the shoulder formed at the enlarged portion of one of the said elements, both the elements and the locking ring being provided with a wrench seat.

In testimony whereof I affix my signature.

FRANK P. KIRK.